UNITED STATES PATENT OFFICE.

KARL RÜCKER, OF BERLIN, GERMANY, ASSIGNOR TO DEUTSCHE CONSERVIERUNGS-GESELLSCHAFT FÜR NAHRUNGS-UND GENUSSMITTEL MIT BESCHRÄNKTER HAFTUNG, OF BERLIN, GERMANY.

PITCH SUBSTITUTE AND PROCESS FOR MAKING THE SAME.

No. 867,757.  Specification of Letters Patent.  Patented Oct. 8, 1907.

Application filed November 9, 1906. Serial No. 342,748.

*To all whom it may concern:*

Be it known that I, KARL RÜCKER, chemist, a subject of the German Emperor, residing at Berlin, Germany, have invented certain new and useful Improvements in a Pitch Substitute and Process for Making the Same; and I do hereby declare the following to be a full, clear, and exact description of the invention, such as will enable others skilled in the art to which it appertains to make and use the same.

My invention relates to a pitch substitute, and process for making the same, mainly intended for use in breweries, and which substitute compared to the pitch hitherto known, has the advantages that it is very liquid, does not become brittle when solidified does not communicate any unpleasant taste to the beer, and adheres well to wood, cement, iron and the like.

The new product according to this invention consists essentially of a mixture of resin, paraffin and thickened linseed oil. These products are mixed together and thickened by heating until they reach the desired consistency.

About 50% resin, 38% paraffin and 12% thickened linseed oil are used.

The process for manufacturing a pitch substitute according to this invention is preferably carried out as follows:—the oil is first taken alone and thickened to a mass which is solid when cold, by passing air through the oil in the well known manner used in the manufacture of varnish. As is well known, this causes an oxidation of the oil which in the present case is necessary, because otherwise the pitch, and thus the beer, would be given a taste or smell of oil. When the materials have been mixed in the proportion stated, the mixture is heated again and air blown through the same. By this treatment, the mixture is rendered very thorough, and it may be left out of consideration whether the materials used, enter into any combinations with each other. In any case, the mixture thus treated, is very solid and yet so flexible that for coating casks and the like less than half of the quantity of the pitch-bodies hitherto in use, may be employed. Moreover, the new pitch is much more durable than that hitherto used.

Having now particularly described and ascertained the nature of my invention, and in what manner the same is to be performed, I declare that what I claim is:—

1. The process of manufacturing a pitch substitute, which consists in thickening linseed oil until it is solid when cold by passing air therethrough, mixing the thickened oil with resin and paraffin, and still further thickening the mixture by passing the air therethrough, substantially as described.

2. A solid pitch substitute composed of resin, paraffin and thickened linseed oil, the whole thickened together and solid when cold, substantially as described.

3. A pitch substance composed of substantially 50 per cent. of resin, 38 per cent. of paraffin and 12 per cent. of thickened linseed oil, the whole being thickened together and solid when cold, substantially as described.

In testimony whereof, I affix my signature, in presence of two witnesses.

KARL RÜCKER.

Witnesses:
 WOLDEMAR HAUPT,
 HENRY HASPER.